United States Patent [19]

Palm

[11] Patent Number: 4,676,701

[45] Date of Patent: Jun. 30, 1987

[54] SLUG RETAINER

[75] Inventor: Bernhard Palm, Brookfield, Wis.

[73] Assignee: Milwaukee Electric Tool Corporation, Brookfield, Wis.

[21] Appl. No.: 881,773

[22] Filed: Jul. 3, 1986

[51] Int. Cl.⁴ ............................................. B23B 51/04
[52] U.S. Cl. ........................................................ 408/67
[58] Field of Search .................. 409/137; 408/67, 200, 408/204, 207

[56] References Cited

U.S. PATENT DOCUMENTS

| | | | |
|---|---|---|---|
| 485,715 | 11/1892 | Smith | 408/67 |
| 2,601,434 | 6/1952 | Du Bois | 408/67 |
| 2,800,812 | 7/1957 | Mueller et al. | 408/67 |
| 2,941,427 | 6/1960 | Ver Nooy | 408/67 |
| 3,349,792 | 10/1967 | Larkin | 408/67 |
| 3,922,107 | 11/1975 | Fowler | 408/67 |
| 4,057,357 | 11/1977 | Daghe et al. | 408/67 |
| 4,279,551 | 7/1981 | Wilterding | 408/67 |

Primary Examiner—William R. Briggs
Attorney, Agent, or Firm—Bayard H. Michael

[57] ABSTRACT

Cutting teeth around the lower edge of an inverted cup-like cutter cut a circular kerf resulting in a circular slug being cut from the material being worked on. The proximal end of a retainer is fixed centrally of the cutter and the distal end projects beyond the plane of the teeth so the resilient tab means on the distal end can be deflected inwardly towards the longitudinal axis of the retainer as the retainer passes through a pilot hole in the material. The tabs engage the underside of the material when the retainer has been passed through the pilot hole and enable removal of the slug through the hole cut by the cutter.

2 Claims, 6 Drawing Figures

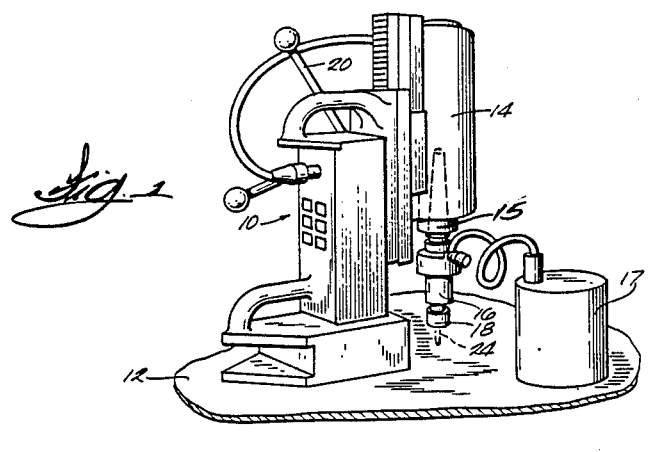
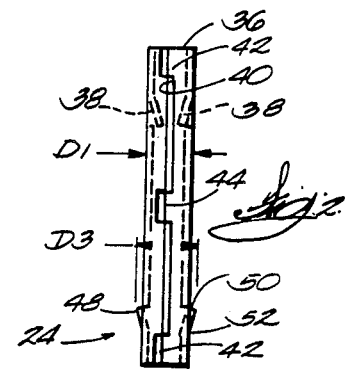
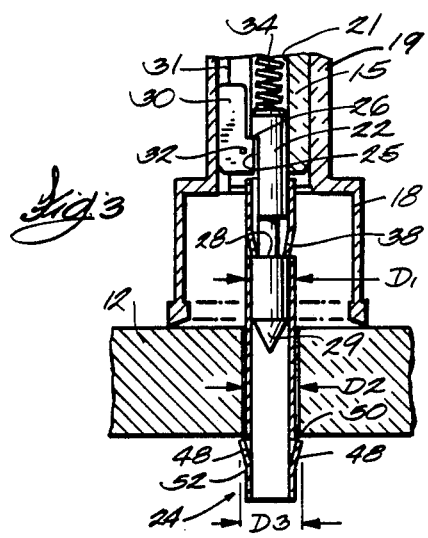
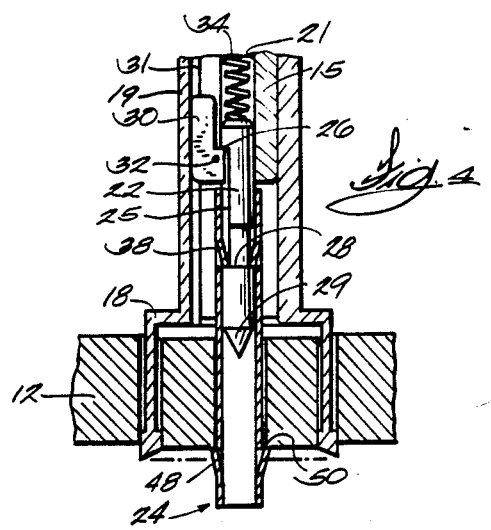
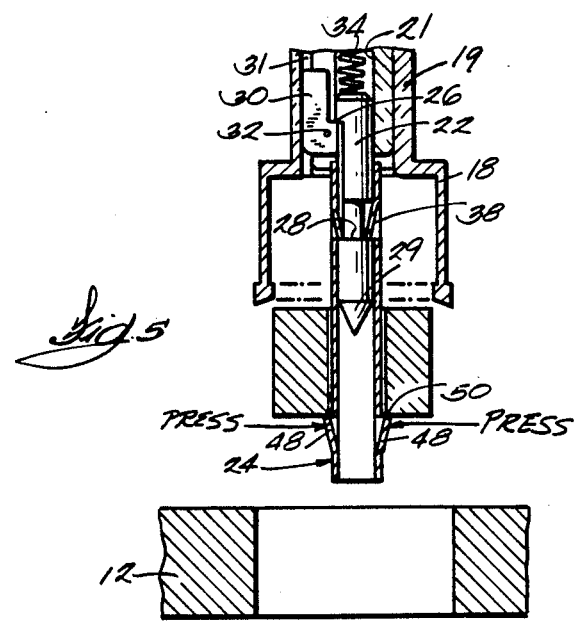
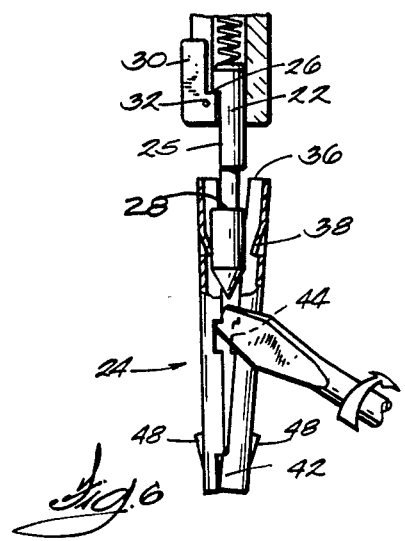

SLUG RETAINER

BACKGROUND OF THE INVENTION

It is faster and more efficient to cut large holes instead of drilling the holes. Since the cutter removes only a circular kerf about a ⅛ inch wide less material is removed. Therefore, cutting is faster, takes less effort and develops less heat. The material inside the circular kerf is called a slug. Normally, the slug is ejected (drops below the work) on completion of the cut. If the underside of the work is inaccessible it may be difficult to impossible to retrieve the slug. In some cases it is not acceptable to leave the slug behind. This invention is directed to retention of the slug so it can be retrieved through the hole.

SUMMARY OF THE INVENTION

This invention provides a slug retainer for use with a hole cutter having cutting teeth around the lower edge of the inverted cup-like cutter to cut a circular kerf resulting in a circular slug. The retainer has its proximal end fixed centrally of the cutter and its distal end projects beyond the plane of the teeth farther than the thickness of the material to be cut. Tabs are provided on the distal end to engage the underside of the slug after the material has been cut, thus enabling removal of the slug from the hole.

Another feature of this invention is the method of cutting holes with a hole cutter provided with the present slug retainer. First a pilot hole is drilled at the desired location. Then the aforesaid retainer, mounted on the hole cutter, is passed through the pilot hole so the tabs are below the material. Then the hole saw is used to cut the hole whereby a slug is formed. The slug is engaged by the tabs and is removed from the underside of the material through the hole.

A further feature is that the retainer is resilient spring steel and grips a centering pin mounted in the cutter.

BRIEF DESCRIPTION OF THE DRAWINGS

FIG. 1 is a perspective view of a magnetic base drill press equipped with the present invention.

FIG. 2 is an elevation of the retainer.

FIG. 3 is a vertical section showing the retainer and cutter ready to cut a hole. The retainer is positioned in a pilot hole.

FIG. 4 is a vertical section showing the cutter and retainer after completion of the hole and withdrawing the slug through the hole.

FIG. 5 is a vertical section showing how the slug is removed.

FIG. 6 is an elevation showing how the retainer is removed from the centering pin.

DETAILED DESCRIPTION OF THE DRAWINGS

FIG. 1 illustrates a magnetic base drill press 10 mounted on ferromagnetic material 12 in which a hole is to be cut. The drill press includes a motor in casing 14 driving a spindle 15 on which a hole cutter 18 is mounted for movement with and relative to the spindle under control of the feed handle 20. Preferably, the arbor assembly includes a manifold 16 to receive and distribute cooling liquid from supply 17 to the cutter. Hole cutters come in various sizes to cut holes ranging from about ¾ of an inch to about 6 inches and typically have a ½ or a 2 inch maximum cutting depth.

The spindle 15 is provided with a center locating pin 22 which projects downwardly to about ¼ inch below the plane of the cutter teeth. The pin is received in an axial bore 21. Normally the centering pin 22 is spring loaded downwardly by a coil spring 34 and can receed into the spindle as the hole is cut but when used with the slug retainer it need not and cannot receed.

The centering pin 22 is used to locate the center of the hole. Then the cutter is fed into the material to be cut. Without a slug retainer this would result in loss of the slug, i.e., the part cut out of the material upon completion of the cut. As indicated above, this may not be desirable in that the space into which the slug would fall may be inaccessible and it may be undesirable to have the slug remain in the space. If it is desired to withdraw the slug, the present arrangement requires that a pilot hole be cut in the material first. This would be done with a drill. The pilot hole is drilled on the center of the hole to be cut later by the hole cutter. Having drilled the pilot hole, the hole cutter is now mounted on the drill press along with the centering pin projecting downwardly from the spindle.

The drive spindle 15 has an axial bore 21 which receives the centering pin 22. The pin has a flat or groove 25 extending between upper shoulder 26 and a lower circumferential recess shoulder 28. The pin is retained in position by key 30 mounted on pin 32 in a slot 31 in the spindle 15. The small end of the key prevents removal of pin 22 and is engaged by shoulder 26 to limit downward movement of the pin (under the bias of coil spring 34 above the pin, if used). The long leg of the key 30 fits in keyway 31 in the shank 19 of the cutter 18 to permit movement of the cutter relative to the spindle while driving the cutter through the key 30.

The retainer 24 is made of resilient steel which is stamped and then rolled to provide an axially split retainer; that is, there is a gap 40 with locating tabs 42 formed at each end and a central locating tab 44 in the middle. These tabs are received in corresponding notches or openings in the opposed side of the gap 40. The retainer is formed to naturally assume a diameter somewhat smaller than the diameter of the main portion of the centering pin. Thus, the retainer will tightly grip the centering pin. The upper end of the retainer 24 has inwardly projecting grip tabs 38 to engage the recess or shoulder 28 when the retainer is pushed up the pin.

The centering pin normally projects about ¼ inch below the plane of the teeth with the tip 29 indicating the center. The retainer 24 should project far enough below the plane of the teeth to position the outwardly projecting retaining tabs 48 on the underside of the material to be cut before the cut is started. Thus, the spindle is lowered to pass the retainer through the pilot hole so the free end 50 of each tab 48 will be below the material being cut. During passage of the retainer through the pilot hole, the tabs 48 will deflect inwardly about the root portion 52 connecting each tab to the retainer. As soon as the tabs clear the underside of the material to be cut, they will pop out and will be in position to engage the underside of the material being cut. This is shown in FIG. 3.

The hole cutter is then operated to cut through the material as shown in FIG. 4. Then the spindle and cutter are raised to withdraw the slug from the hole and to remove the slug, as in FIG. 5, by pressing tabs 48 in to allow the slug to slide down and off. The retainer is removed from the pin by spreading the gap 40 to get tabs 38 clear of the pin 22 as shown in FIG. 6.

It will be noted that when mounted on the pin the nominal diameter $D_1$ of the retainer is slightly less than diameter $D_2$ of the pilot hole. The tips or free ends 50 of the tabs 48 will circumscribe a circle having a diameter $D_3$ which is greater than the diameter $D_2$ of the pilot hole thus ensuring the tabs 48 will engage the underside of the material after the plug has been cut out of the hole.

The axially split slug retainer is mounted on the centering pin fixed in the spindle. The hole cutter is mounted on the spindle and is driven by a key which also fixes the retainer. The retainer has laterally projecting tabs which will engage the underside of the slug. The retainer is passed through a pilot hole before the cut is started. The hole is then cut. After the slug is pulled back through the hole the tabs are pressed inwardly to release the slug.

I claim:

1. The combination with a hole cutter having cutting teeth around the lower edge of an inverted cup-like cutter so as to cut a circular kerf resulting in a circular slug being cut from the material being worked on, of means for retaining said slug, said means comprising, said hole cutter including a central member projecting below said plane of said teeth, a tubular retainer having a proximal end mounted centrally of said central member and a distal end projecting beyond the plane of said teeth, resilient tab means projecting laterally from said distal end and being deflectable inwardly toward the longitudinal axis of said retainer.

said tab means comprising two opposed tabs each having a root portion connected to said distal end close to the tip thereof while the free end of each tab is farther from said tip and the distance between said plane of said teeth and said free end is greater than the thickness of the material to be cut, a shoulder on said central member, radially inwardly facing grip means on said retainer engaging said shoulder to limit movement of said retainer in one direction, and means limiting movement of said retainer on said central member in the opposite direction.

2. A hole cutter according to claim 1 in which said retainer is resilient and axially split to permit removal of said retainer from said central member.

* * * * *